United States Patent
Chen

[11] Patent Number: 5,931,053
[45] Date of Patent: Aug. 3, 1999

[54] BICYCLE PEDAL ASSEMBLY

[76] Inventor: Chung-I Chen, No. 3, Kung-Chi Rd., Yu-Ssi-Kung-Yeh Dist., Ta-Chia Chen, Taichung Hsien, Taiwan

[21] Appl. No.: 09/037,402

[22] Filed: Mar. 10, 1998

[51] Int. Cl.[6] .............................. B62M 3/08; G05G 1/14
[52] U.S. Cl. ........................................ 74/594.6; 74/594.4
[58] Field of Search .............................. 74/594.4, 594.6

[56] References Cited

U.S. PATENT DOCUMENTS

| | | | |
|---|---|---|---|
| 4,928,549 | 5/1990 | Nagano | 74/594.6 |
| 5,697,262 | 12/1997 | Chen | 74/594.6 |
| 5,848,560 | 12/1998 | Lin | 74/594.6 |

*Primary Examiner*—Allan D. Herrmann
*Attorney, Agent, or Firm*—Panitch Schwarze Jacobs & Nadel, P.C.

[57] ABSTRACT

A bicycle pedal assembly includes a pedal body having a front part formed with a fixed first jaw projection, a rear part, an intermediate part to mount the pedal body rotatably on an axle, and a cavity formed in the rear part and opened at a top side of the pedal body. A first retaining member has a first spring seat received in the cavity, and an elongated flank formed on top of the first spring seat. The flank has two spaced apart forwardly projecting second jaw projections opposite to the first jaw projection. A second retaining member has a second spring seat which is juxtaposed to the first spring seat in the cavity and which has a top end that projects rearwardly and upwardly from the cavity below the flank. A pivot shaft extends through the cavity to mount pivotally the first and second spring seats thereon. A first torsion spring is sleeved around the pivot shaft in the first spring seat to bias the flank and the second jaw projections to move forwardly. A second torsion spring is sleeved around the pivot shaft in the second spring seat to bias the top end of the second spring seat to move forwardly. A cover plate is disposed at the top side and is mounted on the rear part of the pedal body to cover the cavity.

8 Claims, 8 Drawing Sheets

150 # BICYCLE PEDAL ASSEMBLY

BACKGROUND OF THE INVENTION

1. Field of the Invention

The present invention relates to a bicycle pedal assembly, more particularly to a bicycle pedal assembly which provides a good coupling force for coupling with a cyclist's shoe and which prevents entry and accumulation of dust and mud in the pedal assembly to prevent adverse affect to the operation of the pedal assembly.

2. Description of the Related Art

U.S. Pat. No. 5,697,262 discloses a quick-release pedal which includes a pedal body, a pair of retaining units, and two cleat engaging members for coupling with a cleat on a cyclist's shoe. The quick-release pedal provides a good coupling force with the cleat on the cyclist's shoe. However, it is noted that the aforementioned quick-release pedal has a relatively complicated structure. Moreover, the major part of the pedal is exposed from the pedal body, and the pedal has an uneven top side. Dust and mud are easily introduced into the pedal and can easily accumulate on the uneven top side to adversely affect operation of the retaining units and the cleat engaging members when coupling with the cleat on the cyclist's shoe.

SUMMARY OF THE INVENTION

The main object of the present invention is to provide a bicycle pedal assembly which has a relatively simple structure and which prevents entry and accumulation of dust and mud in the pedal assembly to prevent adverse affect to the operation of the pedal assembly when coupling with a cleat on a cyclist's shoe.

Accordingly, the bicycle pedal assembly of the present invention includes an axle, a pedal body, first and second retaining members, a pivot shaft, first and second torsion springs, and a cover plate. The pedal body has a top side, a front part formed with a fixed first jaw projection that projects upwardly from the front part, a rear part, an intermediate part which is provided between the front and rear parts and which has an axle receiving bore to mount the pedal body rotatably on the axle, and a cavity which is formed in the rear part and which is opened at the top side. The first retaining member has a first spring seat received in the cavity, and an elongated flank that is formed on top of the first spring seat and that extends laterally from the first spring seat. The flank projects outwardly of the cavity and extends upwardly from the rear part. The flank has two spaced apart forwardly projecting second jaw projections opposite to the first jaw projection. The second retaining member has a second spring seat which is juxtaposed to the first spring seat in the cavity and which has a top end that projects rearwardly and upwardly from the cavity below the flank. The pivot shaft extends parallel to the axle and through the cavity to mount pivotally the first and second spring seats thereon. The first torsion spring is sleeved around the pivot shaft in the first spring seat to bias the flank and the second jaw projections to move forwardly. The second torsion spring is sleeved around the pivot shaft in the second spring seat to bias the top end of the second spring seat to move forwardly. The cover plate is disposed at the top side of the pedal body and is mounted on the rear part of the pedal body to cover the cavity.

BRIEF DESCRIPTION OF THE DRAWINGS

Other features and advantages of the present invention will become apparent in the following detailed description of the preferred embodiment with reference to the accompanying drawings, in which.

DETAILED DESCRIPTION OF THE PREFERRED EMBODIMENT

Figure 1:
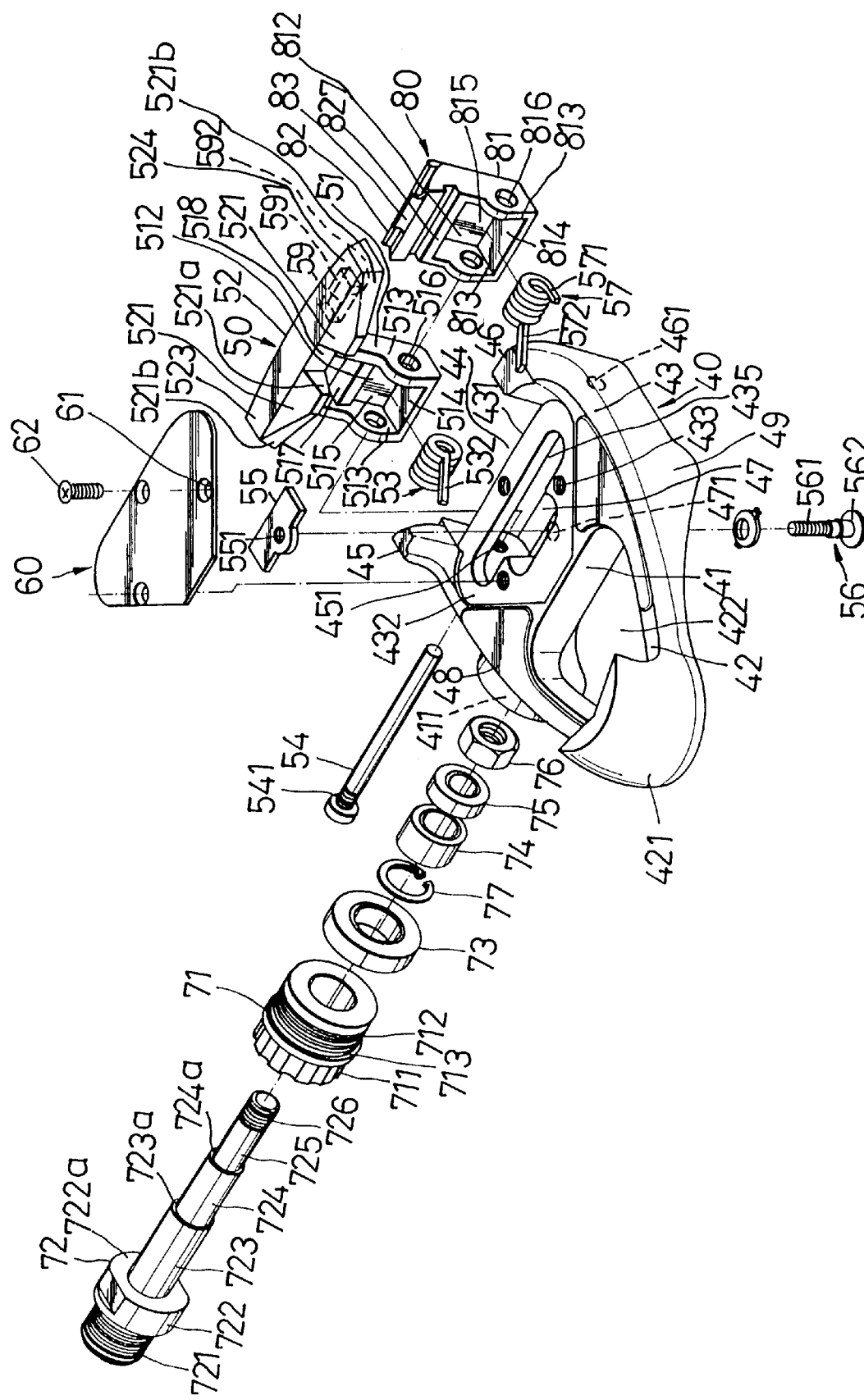
FIG. 1 is an exploded perspective view of a preferred embodiment of a bicycle pedal assembly according to the present invention.
Figure 2:
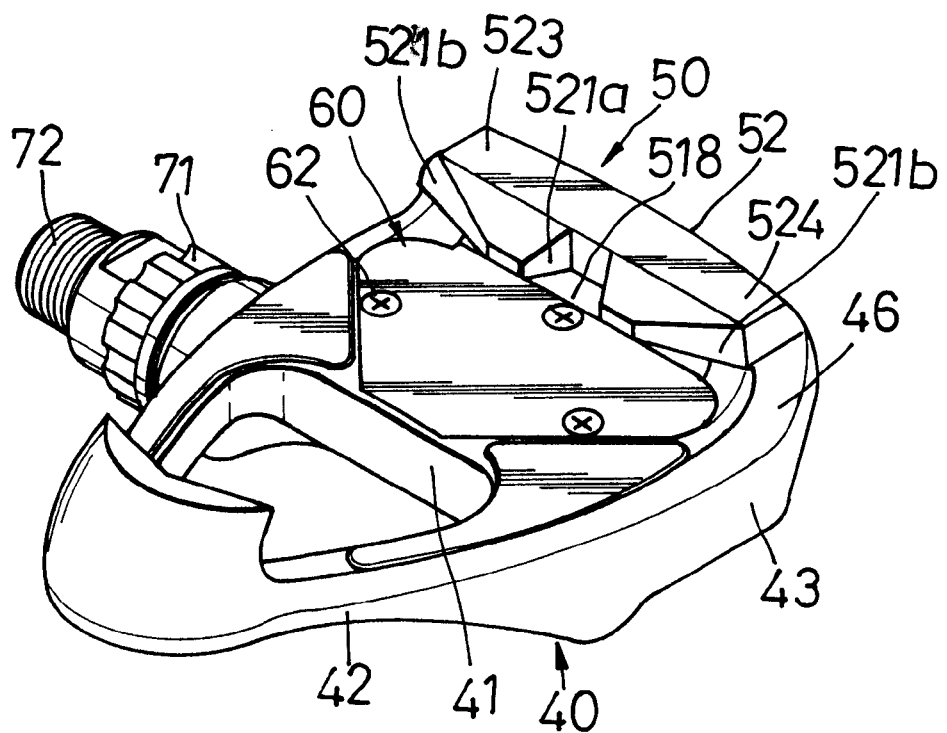
FIG. 2 is a perspective view of the preferred embodiment.

Referring to FIGS. 1 and 2, the preferred embodiment of the bicycle pedal assembly of the present invention is shown to include an axle 72, a pedal body 40, a first retaining member 50, a second retaining member 80, a pivot shaft 54, a first torsion spring 53, a second torsion spring 57, a press plate 55 and a cover plate 60.

The pedal body 40 is generally triangular in shape and has a front part 42, a rear part 43 and an intermediate part 41 provided between the front and rear parts 42, 43. The front part 42 is formed with a fixed first jaw projection 421 that projects upwardly from a front end thereof. The intermediate part 41 is hollow and confines an axle receiving bore 411 therein for receiving the axle 72. The front part 42 has a hollowed-out portion 422 to reduce the weight of the pedal body 40. The rear part 43 is formed with a cavity 435 which is opened at a top side and at a rear side of the pedal body 40. A hollow triangular locking plate 431 is mounted on the top side of the rear part 43. The pedal body 40 further has two opposite side walls 48, 49 which extend from the front part 42 to the rear part 43. Two spaced apart projections 45, 46 are formed on the side walls 48, 49 and protrude upwardly from a rear end of the rear part 43. The projections 45, 46 confine a space 44 therebetween at the rear end of the rear part 43. The locking plate 431 has a top surface indented relative to the side walls 48, 49 to form an indentation 432 for accommodating the cover plate 60. The locking plate 431 is formed with a plurality of threaded fastener holes 433. The side wall 48 has a rear end formed with a threaded through hole 451. The side wall 49 has a rear end formed with a blind insert hole 461 aligned with the threaded through hole 451. The rear part 43 has a bottom wall 47 below the locking plate 431 and formed with a through hole 471.

The first retaining member 50 has a first spring seat 51 and an elongated flank 52 that is formed on top of the first spring seat 51 and that extends laterally and horizontally from the first spring seat 51. The flank 52 has two spaced apart forwardly projecting second jaw projections 521 opposite to the first jaw projection 421. The second jaw projections 521 form an engaging groove 518 therebetween. Each of the second jaw projections 521 has an inclined first guide face 521a and an inclined second guide face 521b. The first spring seat 51 has two spaced parallel walls 513, a bottom wall 514 interconnecting the spaced parallel walls 513, and a rear wall 512 interconnecting the spaced parallel walls 513 and the bottom wall 514. The spaced parallel walls 513, the rear wall 512 and the bottom wall 514 cooperatively form a first spring chamber 515 thereamong for receiving the first torsion spring 53. The parallel walls 513 are formed with aligned pivot holes 516 to permit passage of the pivot shaft 54. The flank 52 is formed on top of the spaced parallel walls 513 and the rear wall 512 of the first spring seat 51. The first spring seat 51 is received in the cavity 435 via the open rear side of the pedal body 40, and has a first abutment wall 517 that abuts against the locking plate 431. The flank 52 projects outwardly of the cavity 435 and extends upwardly from the rear part 43 of the pedal body 40. The flank 52 fills the space 44 between the projections 45, 46, and has two laterally opposing end parts 523, 524 resting on the spaced apart projections 45, 46. The flank 52 has a bottom side formed with a rectangular engaging recess 59 which has a substantially vertical front recess wall 592 and a substantially vertical rear recess wall 591 that is opposite to and that is spaced from the front recess wall 592.

The second retaining member 80 has a second spring seat 81 and a top end 82. The second spring seat 81 has two spaced parallel walls 813, a bottom wall 814 interconnecting the spaced parallel walls 813, and a rear wall 812 interconnecting the spaced parallel walls 813 and the bottom wall 814. The spaced parallel walls 813, the rear wall 812 and the bottom wall 814 cooperatively form a second spring chamber 815 thereamong for receiving the second torsion spring 57. The parallel walls 813 are formed with aligned pivot holes 816 which are aligned with the pivot holes 516 to permit passage of the pivot shaft 54. The top end 82 of the second retaining member 80 interconnects the parallel walls 813 and the rear walls 812. The top end 82 has an engaging tongue 83 which projects upwardly and which is received in the engaging recess 59 of the first retaining member 50. The second spring seat 81 is juxtaposed to the first spring seat 51 and is also received in the cavity 435 via the open rear side of the pedal body 40. The top end 82 of the second retaining member 80 projects rearwardly and upwardly from the cavity 435 below the flank 52 of the first retaining member 50, and has a second abutment wall 827 to abut against the locking plate 431. The pivot shaft 54 extends through the cavity 435 and through the threaded through hole 451, the aligned pivot holes 516, 816 of the first and second spring seats 51, 81, and is inserted into the insert hole 461. The pivot shaft 54 has a threaded section 541 engaging the threaded through hole 451 for retaining the pivot shaft 54 on the pedal body 40. The first and second spring seats 51, 81 are thus mounted pivotally on the pivot shaft 54.

The first torsion spring 53 is disposed in the first spring chamber 515 and is sleeved around the pivot shaft 54. The first torsion spring 53 has a first leg 532 which extends upwardly and forwardly, and a second leg (not shown) which abuts against the bottom wall 514 of the first spring seat 51.

The second torsion spring 57 is disposed in the second spring chamber 815 and is sleeved around the pivot shaft 54. The second torsion spring 57 has a first leg 572 which extends upwardly and forwardly, and a second leg 571 which abuts against the bottom wall 814 of the second spring seat 81.

The press plate 55 has a suitable thickness and is disposed in the cavity 435 substantially horizontally in front of the first and second spring seats 51, 81. The first leg 532 of the first torsion spring 53 is pressed downward by the press plate 55 so that the first torsion spring 53 biases the flank 52 and the second jaw projections 521 of the first retaining member 50 to move forwardly. The first leg 572 of the second torsion spring 57 is also pressed downwardly by the press plate 55 so that the second torsion spring 57 biases the top end 82 of the second retaining member 80 to move forwardly. The press plate 55 has a threaded regulating hole 551 formed therethrough. A regulating rod 56 extends through the through hole 471 from a bottom side of the pedal body 40. The regulating rod 56 is retained in the through hole 471 and has a threaded shank portion 561 which engages threadedly the regulating hole 551 of the press plate 55 so that the press plate 55 moves upwardly and downwardly to adjust biasing forces of the first and second torsion springs 53, 57 when the regulating rod 56 is rotated axially. The regulating rod 56 has an operating head portion 562 retained at and exposed from the bottom side of the pedal body 40 for rotating the regulating rod 56.

The cover plate 60 has a shape conforming with the indentation 432 formed on top of the locking plate 431. The cover plate 60 is formed with locking holes 61 aligned with the threaded fastener holes 433 of the locking plate 431 to permit fastening of the cover plate 60 on the locking plate 431 with the use of screw fasteners 62. The cover plate 60 covers a top side of the cavity 435 to prevent entry of dust and mud into the cavity 435.

Figure 4:
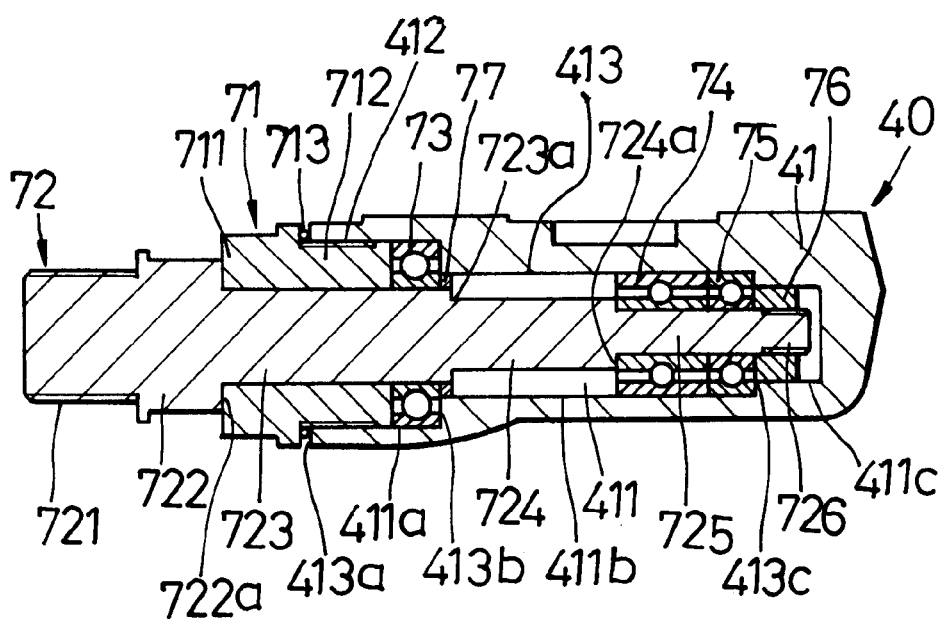
FIG. 4 is a cross-sectional view illustrating how an axle is mounted on a pedal body of the bicycle pedal assembly of the preferred embodiment.

Referring to FIGS. 1 and 4, the axle receiving bore 411 of the pedal body 40 has a bore confining wall 413 which is stepped to confine an outermost first section 411a with a threaded open end 412, an intermediate second section 411b having a cross-section smaller than that of the first section 411a, and an innermost third section 411c having a cross-section smaller than that of the second section 411b. The bore confining wall 413 further has a first shoulder formation 413a around the open end of the axle receiving bore 411, a second shoulder formation 413b between the first and second sections 411a, 411b, and a third shoulder formation 413c between the second and third sections 411b, 411c. The axle 72 has a threaded first end portion 721 adapted to be mounted on a crank arm (not shown) of the bicycle, a flange 722 formed adjacent to the first end portion 721, a first section 723 formed adjacent to the flange 722, a second section 724 formed adjacent to the first section 723 and having a cross-section smaller than that of the first section 723, a third section 725 formed adjacent to the second section 724 and having a cross-section smaller than that of the second section 724, and a threaded second end portion 726 formed adjacent to the third section 725 and opposite to the first end portion 721. The flange 722 and the first section 723 form a shoulder 722a therebetween. The first and second sections 723, 724 form a shoulder 723a therebetween. The second and third sections 724, 725 form a shoulder 724a therebetween. The threaded second end portion 726 engages a nut 76 and extends into the third section 411c of the axle receiving bore 411. A first ball bearing 75, which is sleeved around the third section 725 of the axle 72, is received in the second section 411b of the axle receiving bore 411 and is positioned by the third shoulder formation 413c. A second ball bearing 74 is disposed adjacent to the first ball bearing 75 and is sleeved around the third section 725. The second ball bearing 74 is positioned by the shoulder 724a formed between the second and third sections 724, 725 of the axle 72. A tubular blocking member 71 has a teethed end section 711, a threaded section 712, and a seal ring 713 sleeved thereon between the teethed end section 711 and the threaded section 712. The blocking member 71 is sleeved rotatably on the first section 723 so that the teethed end section 711 abuts against the shoulder 722a of the axle 72. The threaded section 712 of the blocking member 71 engages the threaded open end 412 of the axle receiving bore 411. A third ball bearing 73 is also sleeved around the first section 723 of the axle 72 adjacent to the blocking member 71 and is positioned by the second shoulder 413b of the bore confining wall 413 of the pedal body 40. A C-ring 77 is sleeved around the first section 723 of the axle 72 adjacent to the third ball bearing 73.

Referring again to FIGS. 1 and 2, to assemble the bicycle pedal assembly of the present embodiment, the first and second torsion springs 53, 57 are disposed in the first and second spring chambers 515, 815, respectively, so that the second leg of each of the first and second torsion springs 53, 57 abuts against the bottom wall 514, 814 of the respective one of the first and second spring seats 51, 81. The second retaining member 80 is disposed below the flank 52 of the first retaining member 50 so that the engaging tongue 83 extends into the engaging recess 59 of the first retaining member 50. The first and second spring seats 51, 81 are then disposed in the cavity 435 via the open rear side of the pedal body 40 so that the flank 52 of the first retaining member 50 fills the space 44 between the projections 45, 46 of the pedal body 40 and so that the two opposite end parts 523, 524 of the flank 52 rest on the projections 45, 46. The pivot shaft 54 is then extended through the threaded through hole 451 of the pedal body 40, the aligned pivot holes 516, 816 of the first and second spring seats 51, 81, and the first and second torsion springs 53, 57, and is inserted into the insert hole 461 of the pedal body 40. The pivot shaft 54 can then be turned with the use of a tool (not shown) so that the threaded section 541 engages the threaded through hole 451 for retaining the pivot shaft 54 on the pedal body 40. After the first and second retaining members 50, 80 are assembled to the pedal body 40, the abutment walls 517, 827 of the first and second retaining members 50, 80 abut against a rear side of the locking plate 431, and the engaging tongue 83 of the second retaining member 80 abuts against the rear recess wall 591 of the engaging recess 59 of the first retaining member 50 (see FIG. 3). The press plate 55 is then disposed in the cavity 435 to press the first legs 532, 572 of the torsion springs 53, 57. The regulating rod 56 is extended from the bottom side of the pedal body 40 via the through hole 471 of the pedal body 40 to engage threadedly the regulating hole 551 of the press plate 55. Thereafter, the cover plate 60 is disposed on top of the locking plate 431 and the press plate 55, and is fastened to the locking plate 431 with the use of the screw fasteners 62.

Referring to FIGS. 1 and 4, assembly of the axle 72 to the pedal body 40 is conducted in the following manner: The blocking member 71 is sleeved on the first section 723 of the axle 72 so that the teethed end section 711 abuts against the flange 722 of the axle 72. The third ball bearing 73 is then sleeved on the first section 723 to be in contact with an end face of the blocking member 71. The C-ring 77 is then disposed around the first section 723 adjacent to the third bearing 73 for positioning the third bearing 73 on the axle 72. The first and second ball bearings 75, 74 are sleeved around the third section 725 of the axle 72. The nut 76 is threaded to the threaded end portion 726 of the axle 72, and is disposed adjacent to the first ball bearing 75 for positioning the first and second ball bearings 75, 74 on the axle 72. The axle 72, together with the blocking member 71, the ball bearings 75, 74, 73 and the C-ring 77, is extended into the axle receiving bore 411 of the intermediate part 41 of the pedal body 40 so that the threaded section 712 of the blocking member 71 engages threadedly the threaded open end 412 of the axle receiving bore 411. Assembly of the axle 72 to the pedal body 40 is thus completed.

Figure 3:
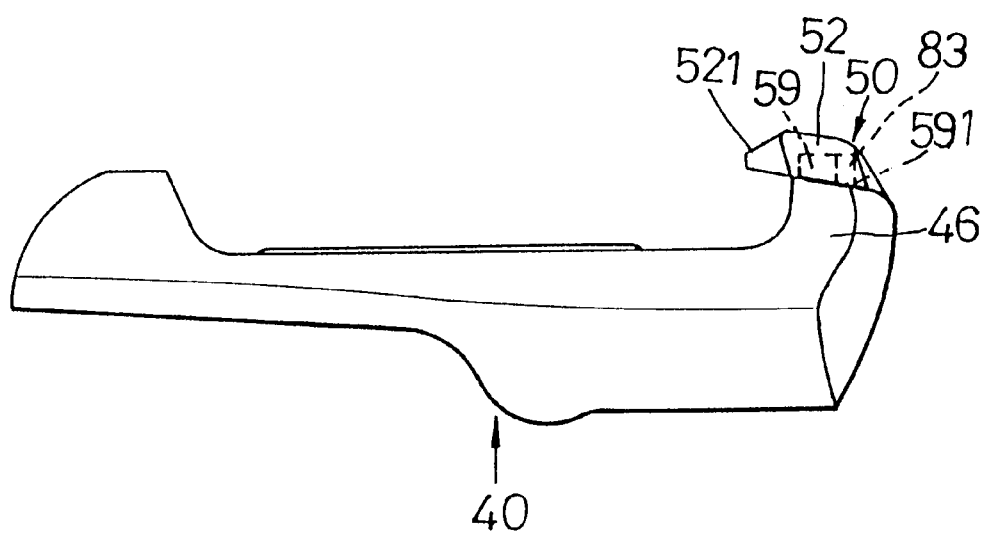
FIG. 3 is a side view of the preferred embodiment before coupling with a cleat on a cyclist's shoe.
Figure 5:
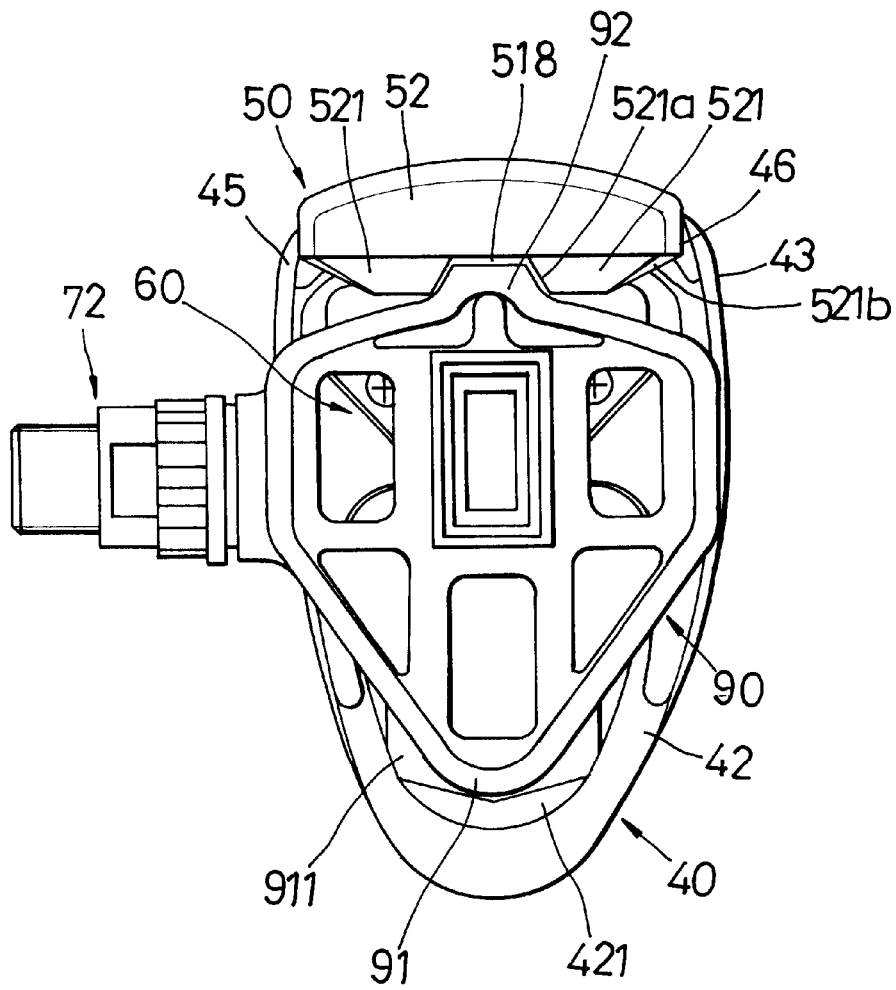
FIG. 5 is a top view of the bicycle pedal assembly of the preferred embodiment when the cleat on a cyclist's shoe is operated for mounting thereon.
Figure 6:
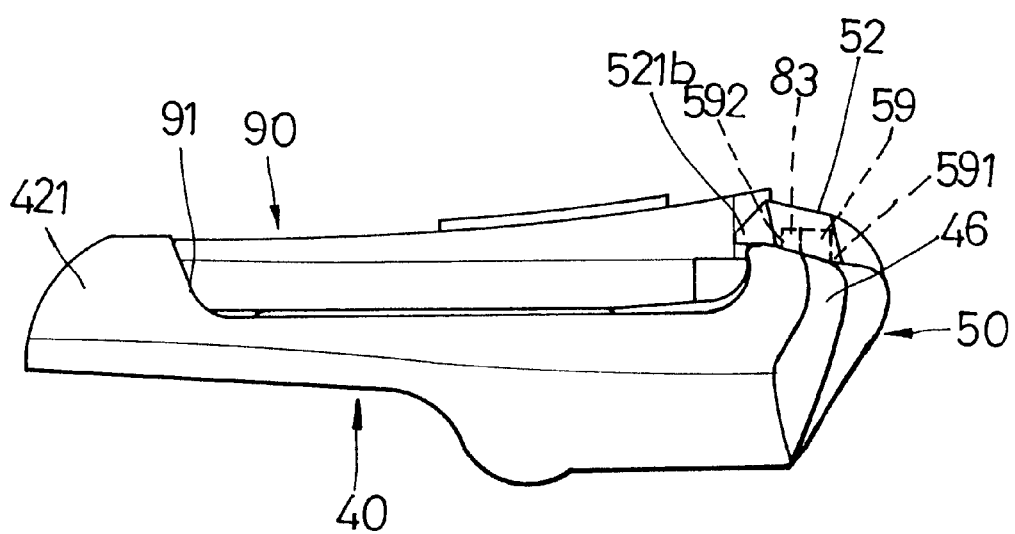
FIG. 6 is a side view of the bicycle pedal assembly of the preferred embodiment when the cleat on the cyclist's shoe is operated for mounting thereon.
Figure 7:
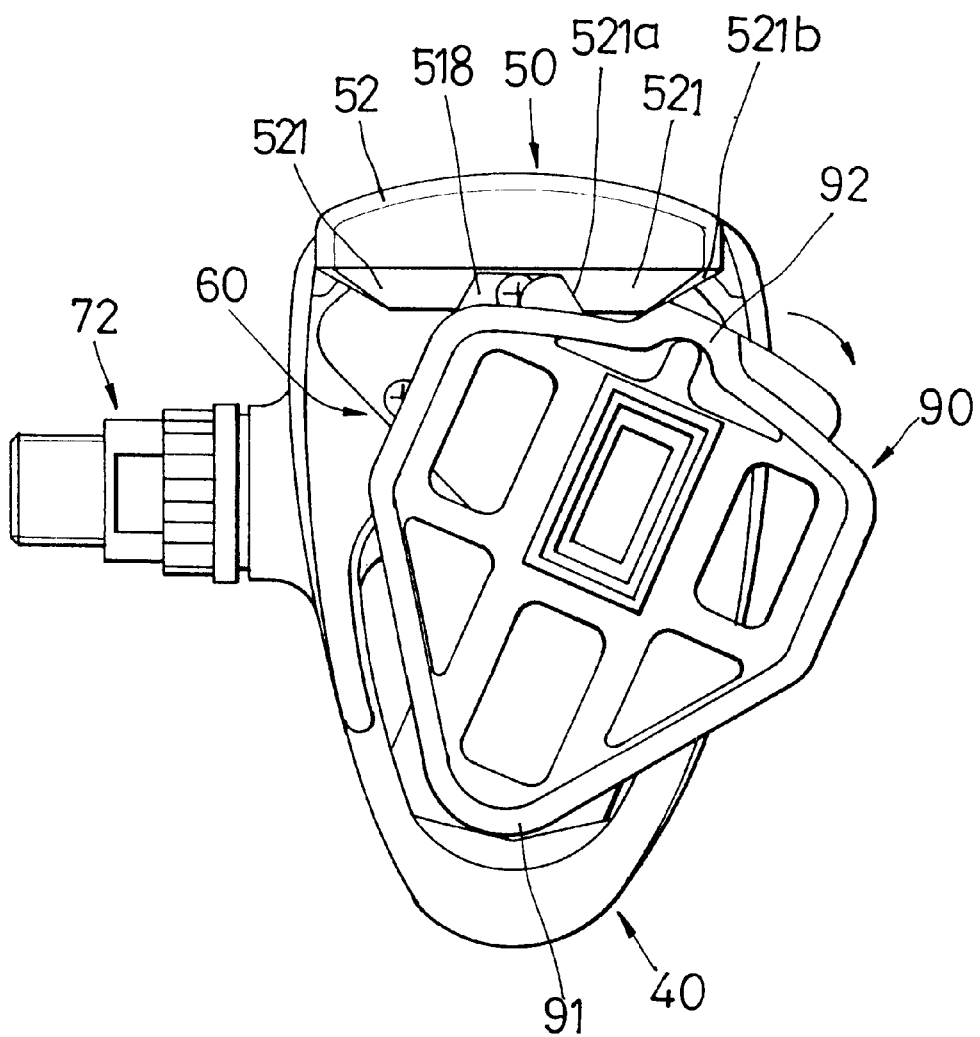
FIG. 7 is a top view of the bicycle pedal assembly of the preferred embodiment when the cleat is operated for release from the bicycle pedal assembly.
Figure 8:
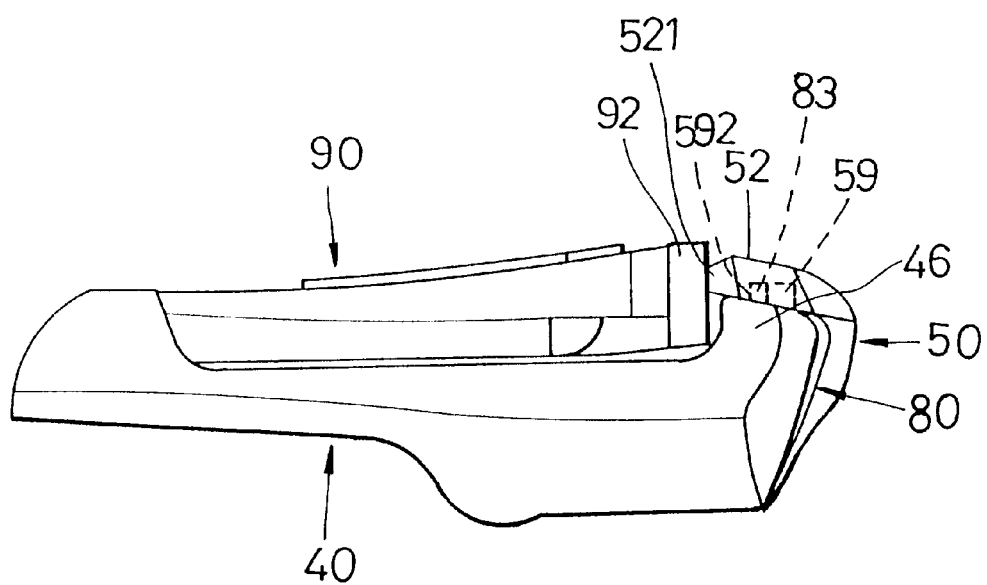
FIG. 8 is a side view of the bicycle pedal assembly of the preferred embodiment when the cleat is operated for release from the bicycle pedal assembly.

Referring to FIGS. 5 and 6, when a cleat 90 on a cyclist's shoe (not shown) is to be mounted on the pedal assembly of the present embodiment, a flange 911 formed on a front end of the cleat 90 is extended to a bottom side of the front end of the pedal body 40 so that a front wedge projection 91 formed on the front end of the cleat 90 engages the first jaw projection 421. A turning force is then applied to the cleat 90 so that a rear wedge projection 92 formed on a rear end of the cleat 90 slides past the guide face 521b of one of the second jaw projections 521 to push the second jaw projections 521 and the flank 52 rearward against the biasing force of the first torsion spring 53 until the rear wedge projection 92 of the cleat 90 extends into the engaging groove 518 between the second jaw projections 521 for engaging the second jaw projections 521. Referring to FIG. 3, since the engaging tongue 83 of the second retaining member 80 normally abuts against the rear recess wall 591 of the engaging recess 59, the flank 52 moves independently of the engaging tongue 83 when it is pushed rearward by the cleat 90 during mounting of the cleat 90 on the pedal assembly. In other words, only the first retaining member 50 is moved by the cleat 90 when the cleat 90 is mounted on the pedal assembly. Therefore, only the biasing force of the first torsion spring 53 must be overcome for mounting the cleat 90 on the pedal assembly. Referring to FIG. 6, after the cleat 90 is mounted on the pedal assembly, the engaging tongue 83 of the second retaining member 80 abuts against the front recess wall 592. Referring to FIGS. 7 and 8, to release the cleat 90 from the pedal assembly, a force is once again applied to the cleat 90 so that the rear wedge projection 92 pushes the flank 52 and the second jaw projections 521 to move further rearward. At this time, the front recess wall 592 moves the engaging tongue 83 rearward so that the second retaining member 80 moves together with the first retaining member 50. The cleat 90 can thus be disengaged from the pedal assembly. As such, the sum of the spring forces of the first and second torsion springs 53, 57 must be overcome when the cleat 90 is to be released from the pedal assembly. The pedal assembly thus provides a relatively good coupling force for coupling with the cleat 90 on the cyclist's shoe. Referring again to FIG. 1, to adjust the biasing forces of the first and second torsion springs 53, 57, the operating head portion 562 of the regulating rod 56 may be turned with the use of a tool via the bottom side of the pedal body 40.

Since the cover plate 60 is mounted on the rear part 43 of the pedal body 40 to cover the open top side of the cavity 435, dust and mud on the cyclist's shoe can be effectively prevented from entering into the cavity 435 to prevent adverse affect to the operation of the retaining members 50, 80 and the torsion springs 53, 57. With the provision of three ball bearings 75, 74, 73 between the axle 72 and the pedal body 40, the pedal body 40 is permitted to rotate smoothly about the axle 72. An enhanced resistance to wearing is thus imparted to the axle 72 to prolong the service life of the same. In addition, when mounting the cleat 90 on the pedal assembly, only the torsion force of the first torsion spring 53 must be overcome. On the other hand, when releasing the cleat 90 from the pedal assembly, the sum of the torsion forces of the first and second torsion springs 53, 57 must be overcome. The pedal assembly thus provides a relatively good coupling force for coupling with the cyclist's shoe to prevent untimely release of the cyclist's shoe from the pedal assembly.

With this invention thus explained, it is apparent that numerous modifications and variations can be made without departing from the scope and spirit of this invention. It is therefore intended that this invention be limited only as indicated in the appended claims.

I claim:

1. A bicycle pedal assembly for coupling with a cleat on a shoe, said bicycle pedal assembly comprising:

an axle;

a pedal body having a top side, a front part formed with a fixed first jaw projection that projects upwardly from said front part, a rear part, an intermediate part which is provided between said front and rear parts and which has an axle receiving bore to mount said pedal body rotatably on said axle, and a cavity which is formed in said rear part and which is opened at said top side;

a first retaining member having a first spring seat received in said cavity and an elongated flank that is formed on top of said first spring seat and that extends laterally from said first spring seat, said flank projecting outwardly of said cavity and extending upwardly from said rear part, said flank having two spaced apart forwardly projecting second jaw projections opposite to said first jaw projection;

a second retaining member having a second spring seat which is juxtaposed to said first spring seat in said cavity and which has a top end, said top end of said second retaining member projecting rearwardly and upwardly from said cavity below said flank;

a pivot shaft extending parallel to said axle and through said cavity to mount pivotally said first and second spring seats thereon;

a first torsion spring sleeved around said pivot shaft in said first spring seat to bias said flank and said second jaw projections to move forwardly;

a second torsion spring sleeved around said pivot shaft in said second spring seat to bias said top end of said second spring seat to move forwardly; and a cover plate disposed at said top side of said pedal body and mounted on said rear part of said pedal body to cover said cavity.

2. The bicycle pedal assembly as claimed in claim 1, wherein said pedal body further has two opposite side walls which extend from said front part to said rear part of said pedal body, and two spaced apart projections which protrude upwardly from said rear part adjacent to said opposite side walls to confine a space for receiving said flank, said flank filling said space and having two laterally opposing end parts resting on said spaced apart projections.

3. The bicycle pedal assembly as claimed in claim 2, wherein said top end of said second spring seat has a top engaging member to be driven by said flank to move rearward against force of said second torsion spring only when the cleat on the shoe is operated for release from said pedal body, said flank being movable rearward independently of said top engaging member when the cleat is operated for mounting on said pedal body.

4. The bicycle pedal assembly as claimed in claim 3, wherein said top engaging member of said second spring seat is an engaging tongue, said flank having an engaging recess formed in said flank to receive said engaging tongue, said engaging recess having a substantially vertical front recess wall and a substantially vertical rear recess wall which is opposite to and which is spaced from said front recess wall, said engaging tongue being normally biased by said second torsion spring to abut against said rear recess wall, said front recess wall moving said engaging tongue when said flank moves rearward.

5. The bicycle pedal assembly as claimed in claim 2, wherein each of said first and second spring seats has two spaced parallel walls through which said pivot shaft passes, a bottom wall interconnecting said spaced parallel walls, and a rear wall interconnecting said spaced parallel walls and said bottom wall, said flank being formed on top of said spaced parallel walls and said rear wall of said first spring seat, said top end of said second spring seat interconnecting said rear wall and said spaced parallel walls of said second spring seat.

6. The bicycle pedal assembly as claimed in claim 5, wherein said pedal body further includes a press plate mounted inside said cavity substantially horizontally in front of said first and second spring seats and below said cover plate, each of said first and second torsion springs having a forwardly extending first leg that is pressed downward by said press plate and a second leg that abuts against said bottom wall of the corresponding one of said first and second spring seats.

7. The bicycle pedal assembly as claimed in claim 1, wherein said intermediate part of said pedal body further has a bore confining wall which is stepped to confine said axle receiving bore and to form three shoulder formations, and three bearing assemblies provided in said axle receiving bore, said axle being stepped to form three inner sections of different cross-sections and three shoulder formations, said three bearing assemblies being positioned via said shoulder formations of said bore confining wall and said axle.

8. The bicycle pedal assembly as claimed in claim 7, wherein said axle receiving bore has an open end, said intermediate part of said pedal body further including a threaded blocking member sleeved rotatably around said axle and threadedly engaged with said axle receiving bore at said open end.

* * * * *